(12) United States Patent
Yui et al.

(10) Patent No.: US 7,082,923 B2
(45) Date of Patent: Aug. 1, 2006

(54) IDLING SPEED CONTROL SYSTEM AND METHOD

(75) Inventors: Takashi Yui, Toyota (JP); Noboru Takagi, Toyota (JP); Kiyoo Hirose, Nagoya (JP); Keizo Hiraku, Nishikamo-gun (JP); Hirohiko Yamada, Okazaki (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 0 days.

(21) Appl. No.: 11/049,648

(22) Filed: Feb. 4, 2005

(65) Prior Publication Data
US 2005/0178357 A1    Aug. 18, 2005

(30) Foreign Application Priority Data
Feb. 17, 2004    (JP)    ............................. 2004-039826

(51) Int. Cl.
*F02D 3/00*    (2006.01)
*F02D 41/00*    (2006.01)

(52) U.S. Cl. ................................ 123/339.18; 123/90.15

(58) Field of Classification Search ........... 123/339.18, 123/339.16, 339.17, 339.1, 90.15
See application file for complete search history.

(56) References Cited

U.S. PATENT DOCUMENTS

| | | | |
|---|---|---|---|
| 5,081,973 A * | 1/1992 | Minamitani | ............ 123/339.11 |
| 6,082,329 A * | 7/2000 | Kazumasa | ............. 123/339.18 |
| 6,484,676 B1 * | 11/2002 | Shimizu et al. | .......... 123/90.15 |

FOREIGN PATENT DOCUMENTS

JP    8-338273    12/1996

* cited by examiner

*Primary Examiner*—Mahmoud Gimie
(74) *Attorney, Agent, or Firm*—Kenyon & Kenyon LLP

(57) ABSTRACT

An controller detects a change in a load generation state of an accessory device that generates a load on the internal combustion engine during operation, and the controller in turn controls a variable valve mechanism to change at least one of an operation angle and a valve lift of an intake valve of the internal combustion engine, as well as changing an amount of an intake air drawn into the internal combustion engine, in response to the detected change in the load generation state of the accessory device.

8 Claims, 13 Drawing Sheets

IDLING SPEED CONTROL SYSTEM AND METHOD

INCORPORATION BY REFERENCE

The disclosure of Japanese Patent Application No. 2004-039826 filed on Feb. 17, 2004 including the specification, drawings and abstract is incorporated herein by reference in its entirety.

BACKGROUND OF THE INVENTION

1. Field of the Invention

The invention relates to a system and method that control the engine speed of an internal combustion engine (will be referred to simply as "engine") to a target speed through the adjustment of the opening of an intake air regulator valve or the adjustment of the valve lift or operation angle of an intake valve using a variable valve mechanism when the engine is idling.

2. Description of the Related Art

When the engine is idling, the state of load given to the engine from an accessory device which is directly or indirectly driven by the engine (e.g., air conditioner, power-steering unit, head lamps) changes in response to the accessory device being turned on, i.e., in response to the same state shifting from a state in which the accessory device generates no load on the engine to a state in which the accessory device generates load on the engine.

Upon such a shift of the accessory load state, a known method activates a particular idling speed control procedure that increases the engine torque so as to bring the engine speed to a predetermined value to cope with the increase in the engine load which may otherwise result in an unintended decrease in the engine speed. In this procedure, an intake amount regulator valve, such as a throttle valve and an ISCV (Idling Speed Control Valve), is automatically controlled.

At this time, however, if the intake amount is only increased based on the actual increase in the engine load by an ordinary feedback control, the air to be drawn into the combustion chambers may not increase sufficiently quickly. To counter this, the opening of the intake amount regulator valve is corrected by an preliminary correction value corresponding to the load from the accessory device so that the intake amount increases sufficiently quickly.

Meanwhile, other than the foregoing intake amount control, another method has been proposed which controls the intake amount by adjusting the operation characteristic (i.e., valve lift, operation angle) of an intake valve in response to the generation of load by an accessory device (see JP-A-08-338273). According to this method, when the accessory device generates a load on the engine, the operation characteristic of the intake valve is varied so as to improve the charging efficiency of intake air without using the solenoid valve provided in the intake passage.

In the former case, however, since the opening of the intake amount regulator valve is corrected by the preliminary correction value, there will be a significant delay before the intake air increased with the preliminary correction value actually enters each combustion chamber due to a relatively large space inside an intake passage between the intake amount regulator valve and the intake valve. Accordingly, the engine torque does not increase quickly, causing the engine speed to decrease, which may render the engine speed unstable temporarily or may cause an engine stall depending on the degree of increase in the engine load.

In the latter case, the operation characteristic of the intake valve is changed to improve the charging efficiency of intake air and thereby increase the intake amount. However, this is only done with intake air which has flown past the intake amount regulator valve and reached the intake valve. Therefore, the range of changing the intake amount is relatively narrow, and it is still necessary to wait for a further increase in the intake amount which will later be caused by a feedback control of the intake amount regulator valve. Thus, before the opening of the intake amount regulator valve is sufficiently increased by the feedback control in response to the increase in the engine load, the engine speed may decrease to make the engine operation unstable or, depending on the degree of increase in the engine load, cause an engine stall, as in the above-mentioned case in which the opening of the intake amount regulator valve is simply increased by the preliminary correction value.

The above holds true also when the engine load imposed by the accessory device is removed. That is, for example, if the opening of the intake amount regulator valve is reduced by an preliminary correction value in response to the accessory load being removed, the engine torque will not immediately decrease, so the engine may race before the engine torque actually decreases.

Likewise, if the charging efficiency of intake air is decreased by changing the operation characteristic of the intake valve in response to the accessory load being removed, it is still necessary to wait for a further decrease in the engine toque which will later be caused by the feedback control of the intake amount regulator valve. Therefore, in this case, too, the engine may race before the engine torque is further decreased by the feedback control of the intake amount regulator valve.

SUMMARY OF THE INVENTION

In view of the above situation, it is one object of the invention to provide a system and method that prevent an unstable operation of an internal combustion engine which may be caused by a change in the state of load from an accessory device.

To accomplish the above object, a first aspect of the invention relates to an idling speed control system for an internal combustion engine, including (i) an intake amount regulator valve that is arranged in or along an intake passage of the internal combustion engine to regulate an intake amount supplied to the internal combustion engine; (ii) a variable valve mechanism that changes at least one of an operation angle and a valve lift of an intake valve of the internal combustion engine; (iii) a controller that controls the intake amount regulator valve and the variable valve mechanism; and (iv) an accessory device that is mechanically or electrically connected to the internal combustion engine and generates a load on the internal combustion engine during operation. According to this idling speed control system, when the load generation state of the accessory device changes while the internal combustion engine is idling, the controller controls the intake amount regulator valve to change its opening and controls the variable valve mechanism to change the at least one of the operation angle and the valve lift of the intake valve in accordance with the change in the load generation state of the accessory device.

In the idle speed control system described above, the controller changes at least one of the operation angle and valve lift of the intake valve, as well as the opening of the intake amount regulator valve, in response to the change in the load generation state of the accessory device, thus changing the intake amount to an amount suitable for the changed load generation state of the accessory device.

Here, it is noted that changing the operation angle and/or valve lift of the intake valve changes the amount of air brought into each combustion chamber from between the intake amount regulator valve and the intake valve, but it does not directly contribute to increasing the amount of air that will be newly drawn into the internal combustion engine. However, such a change in the intake amount to each combustion chamber occurs very quickly after the operation angle and/or the valve lift of the intake valve changes although that change in the intake amount will only last for a limited time.

As such, by changing the operation angle and/or the valve lift of the intake valve, it is possible to immediately increase the amount of air in each combustion chamber during an initial time period after the load generation state of the accessory device has changed.

Further, before such a temporal effect of changing the intake amount due to the changed operation angle and/or valve lift of the intake valve diminishes, an effect of changing the intake amount due to the changed opening of the intake amount regulator valve reaches the vicinity of the intake valve, whereby the intake amount suitable for the changed load generation state of the accessory device will be maintained even after the foregoing temporal effect of changing the intake amount has faded away.

Accordingly, the foregoing idling speed control system prevents an unstable engine operation which may otherwise be caused as a result of a change in the load generation state of the accessory device.

A second aspect of the invention relates to a method for controlling an idling speed of an internal combustion engine, including (i) detecting a change in a load generation state of an accessory device while the internal combustion engine is idling; and (ii) changing at least one of an operation angle and a valve lift of an intake valve of the internal combustion engine, as well as changing an amount of an intake air drawn into the internal combustion engine, in accordance with the detected change in the load generation state of the accessory device.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein.

DETAILED DESCRIPTION OF THE PREFERRED EMBODIMENTS

First Exemplary Embodiment of Invention

Figure 1:
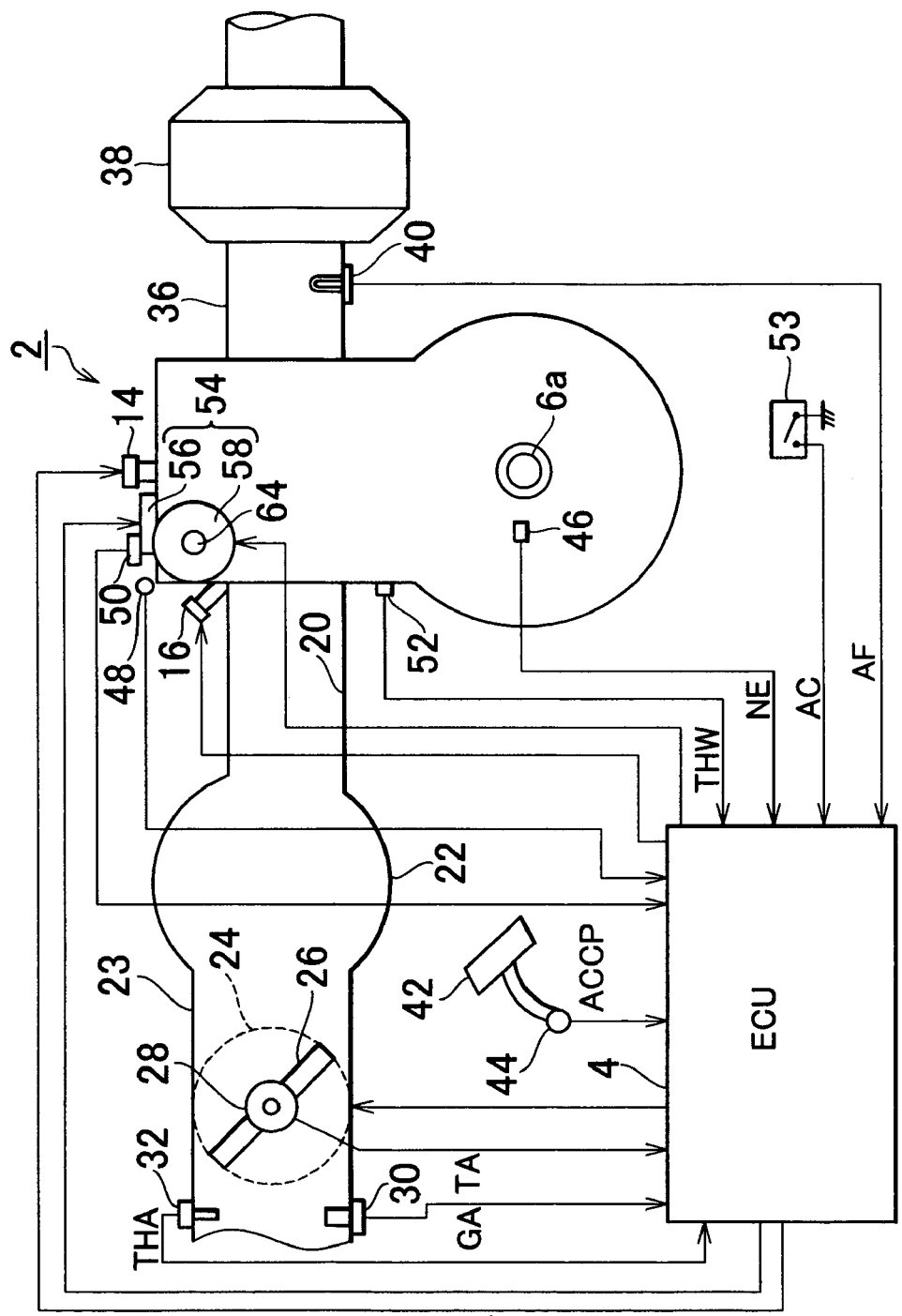
FIG. 1 is a view schematically showing the configuration of an idling speed control system according to a first exemplary embodiment of the invention which is incorporated in a gasoline engine as an internal combustion engine.
Figure 2:
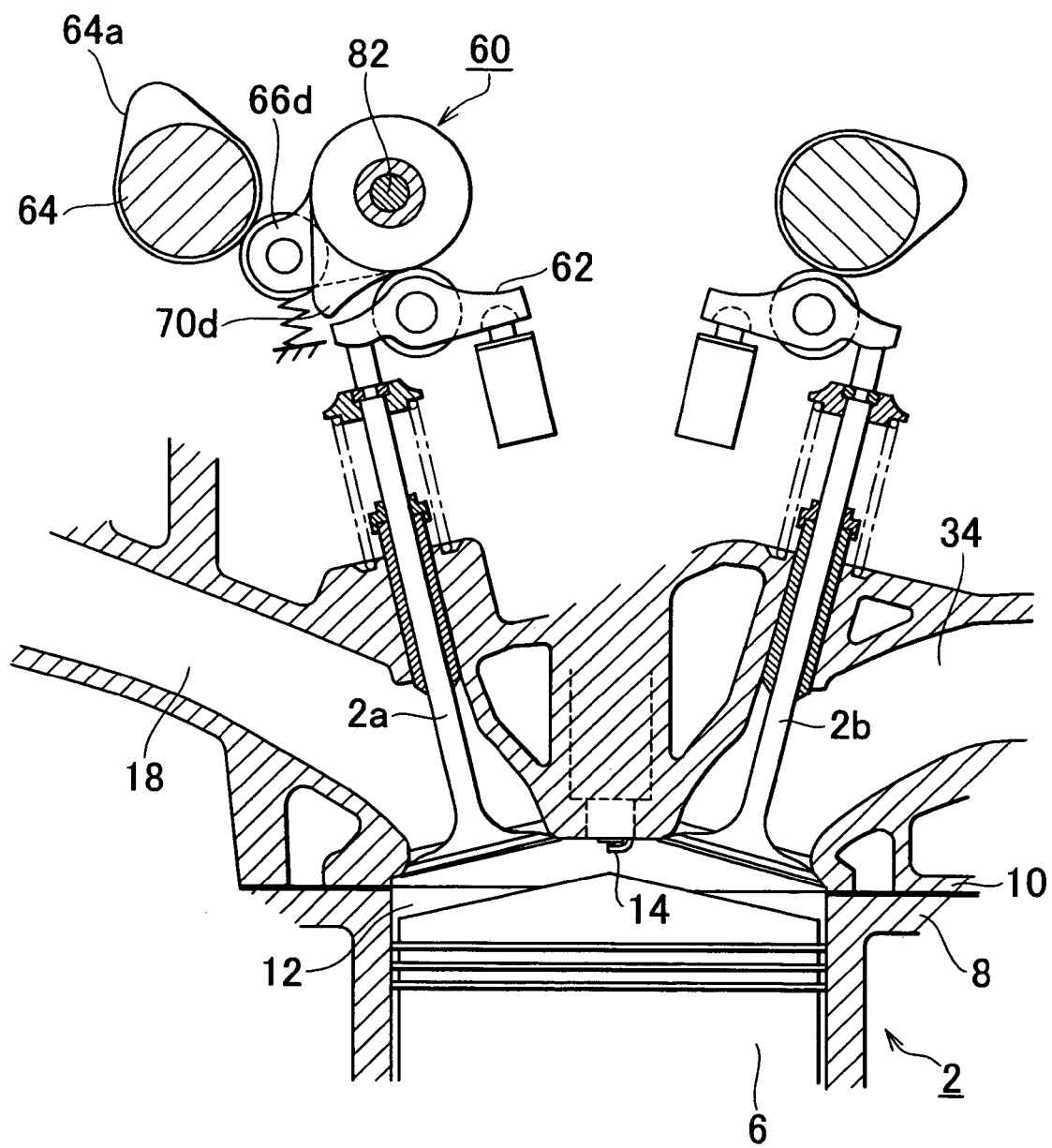
FIG. 2 is a view showing a cross sectional view of a variable valve mechanism which is taken along the longitudinal direction of the engine.

FIG. 1 schematically illustrates the configuration of an idling speed control system according to a first exemplary embodiment of the invention, which is incorporated in a gasoline engine 2 (will be referred to simply as "engine") mounted in a vehicle, not shown. The engine 2 is a four-cylinder engine, and the operation of the engine 2 is controlled by an ECU 4. FIG. 2 is a cross sectional view schematically showing the construction of a variable valve drive train provided for each cylinder of the engine 2. The engine 2 has a four-valve engine structure in which two intake valves 2a and two exhaust valves 2b, thus a total of four valves, are provided in each cylinder. However, it is to be understood that the number of the cylinders and valves of the engine 2 will not be limited to four, respectively, but the engine 2, for example, may be an engine consisting of three cylinders or six or more cylinders, each having two, three, or more than five valves.

The output of the engine 2 is transferred to wheels via a transmission, none of which is shown in the drawings. Referring to FIG. 2, the engine 2 includes pistons 6, a cylinder block 8, and a cylinder head 10. In each cylinder, one of the pistons 6, the cylinder block 8 and the cylinder head 10 together define a combustion chamber 12. Within the cylinder head 10 are embedded igniters 14 for igniting air-fuel mixtures and injectors 16 (shown in FIG. 1) for injecting fuel into each combustion chamber 12 directly. Note that the injectors 16 may alternatively be fuel injectors designed and arranged to inject fuel into intake ports 18 connected to the combustion chambers 12.

Intake ports 18 are opened and closed by the intake valves 2a, and intake branch passages 20 extend from the respective intake ports 18 to a surge tank 22. A throttle valve 26 that is driven by a throttle motor 24 to change its opening (i.e., throttle opening TA) is provided in an intake passage 23 extending from the surge tank 22 in the upstream side. Thus, when throttle opening TA changes, intake amount GA changes accordingly. Throttle opening TA is detected by a throttle sensor 28 and input to the ECU 4. The ECU 4 also receives sensor signals indicative of intake amount GA detected by an intake sensor 30 that is provided upstream of the throttle valve 26 and intake temperature THA detected by an intake temperature sensor 32 that is also provided upstream of the throttle valve 26.

Meanwhile, exhaust ports 34 of the internal combustion engine 2 are opened and closed by exhaust valves 2b. A catalytic converter 38 for purifying exhaust gas is provided midway along an exhaust passage 36 extending from the exhaust ports 34. Upstream of the catalytic converter 38 in the exhaust passage 36 is provided an air-fuel ratio sensor 40 that detects the air-fuel ratio (air-fuel ratio AF) of the exhaust gas flowing through the exhaust passage 36 based on the state of components contained in the exhaust gas. The detected air-fuel ratio AF is input to the ECU 4.

The ECU 4 is a digital computer device that controls the operation of the engine 2. The ECU 4 receives signals from various other sensors detecting the operating state of the engine 2, as well as from the throttle sensor 28, the intake sensor 30, the intake temperature sensor 32, and the air-fuel ratio sensor 40 aforementioned. The other sensors are, for example, an accelerator opening sensor 44 detecting the depression of an accelerator pedal 42 (accelerator opening ACP), an engine speed sensor 46 detecting the rotation of a crank shaft 6a (engine speed), a reference crank angle sensor 48 detecting the rotation of an intake cam shaft which will be used to determine reference crank angles, a slide sensor 50 detecting the operation angle of each intake valve 2a, and a coolant temperature sensor 52 detecting coolant temperature THW. As well as these sensors, the ECU 4 receives signals from an air-conditioner switch 53 that is operated by an operator to turn on and off the air-conditioner which runs on the driving power of the engine 2. Note that, as well as the foregoing sensors, some other known sensors are used in this system to obtain particular operation values.

In operation, based on the information derived from the foregoing sensor signals, the ECU 4 in turn generates operation signals for the injectors 16, the throttle motor 24, and the igniters 14 so as to control the timing of fuel injection, the amount of fuel to be injected, throttle opening TA, ignition timing, and the like, as needed. Likewise, the ECU 4 generates operation signals for the variable valve mechanism 54 based on engine speed NE and engine load (intake amount GA or accelerator opening ACCP), so as to set the operation angle, valve lift, and valve timing of each intake valve 2a to desired values, respectively.

The variable valve mechanism 54 includes a valve operation angle adjusting mechanism 56 and a valve timing mechanism 58. The valve operation angle adjusting mechanism 56 includes, but is not limited to, an intermediate valve drive train 60 shown in FIG. 2. The intermediate valve drive train 60 is capable of changing the phase difference between a roller arm 66d and a nose 70d by moving a control shaft 82 along its axial direction by means of an actuator, not shown. Changing the foregoing phase difference changes the amount each intake valve 2a is operated via a roller rocker arm 62 per revolution of the intake cam shaft 64. Thus, the operation angle and valve lift of each intake valve 2a are together controlled.

Figure 3A:
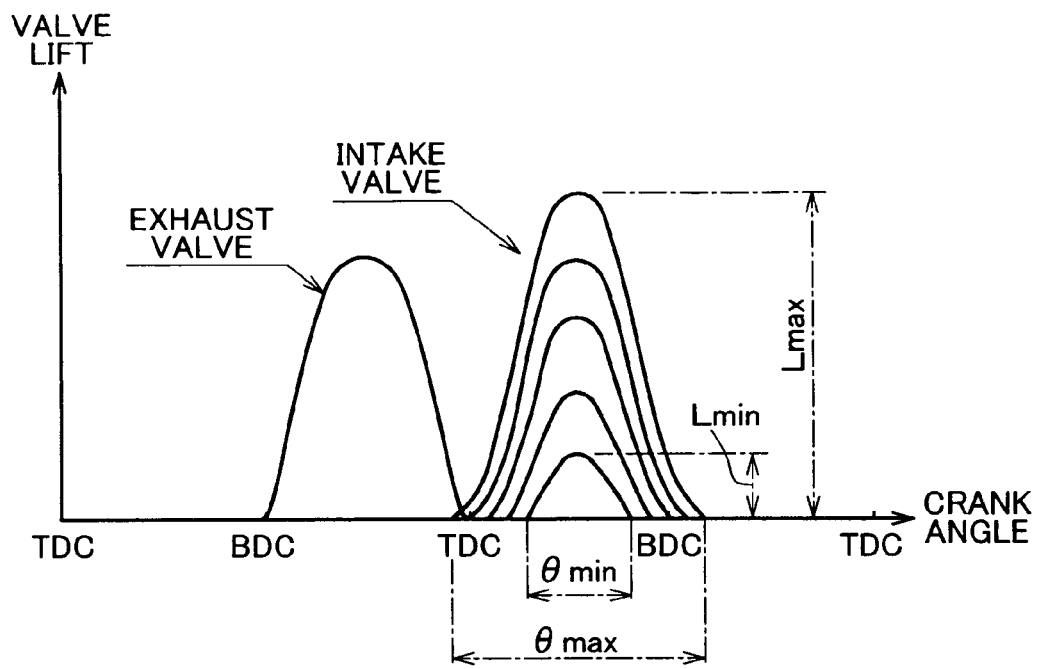
FIG. 3A is a graph illustrating a state in which the operation angle and valve lift of the intake valve are changed by the variable valve mechanism in the first exemplary embodiment.

Referring to the graph in FIG. 3A, the valve operation angle adjusting mechanism 56 changes the operation angle of each intake valve 2a between minimum operation angle θ min and maximum operation angle θ max and changes the valve lift between minimum lift Lmin and maximum lift Lmax.

Figure 3B:
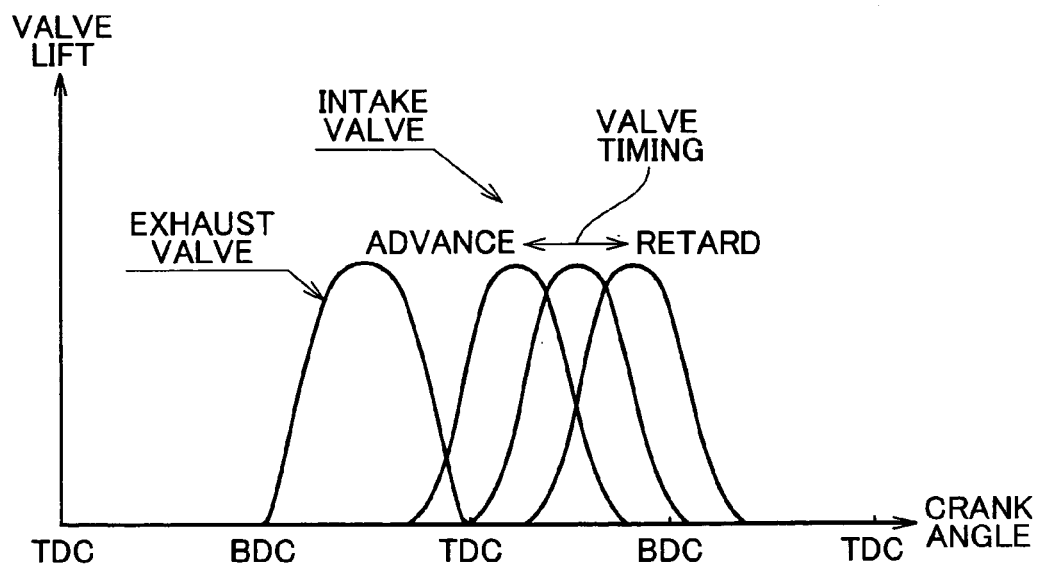
FIG. 3B is a graph illustrating a state in which the valve timing of the intake valve is changed by the variable valve mechanism.

Meanwhile, the valve timing mechanism 58 includes, but is not limited to, a vane type phase adjustment mechanism constructed at a timing sprocket, which changes the phase of the intake cam shaft 64 relative to the crank shaft 6a through hydraulic pressure control. As the valve timing mechanism 58 operates, the valve timing of each intake valve 2a is seamlessly advanced and retarded as illustrated in FIG. 3B. Thus, the combined use of the valve operation angle adjusting mechanism 56 and the valve timing mechanism 58 enables to control the timing the intake valve 2a is opened and the timing closed, separately. As indicated in the graph of FIG. 3B, the open timing and the close timing of the exhaust valves 2b are fixed to BDC (Bottom Dead Center) and TDC (Top Dead Center), respectively.

Figure 4:
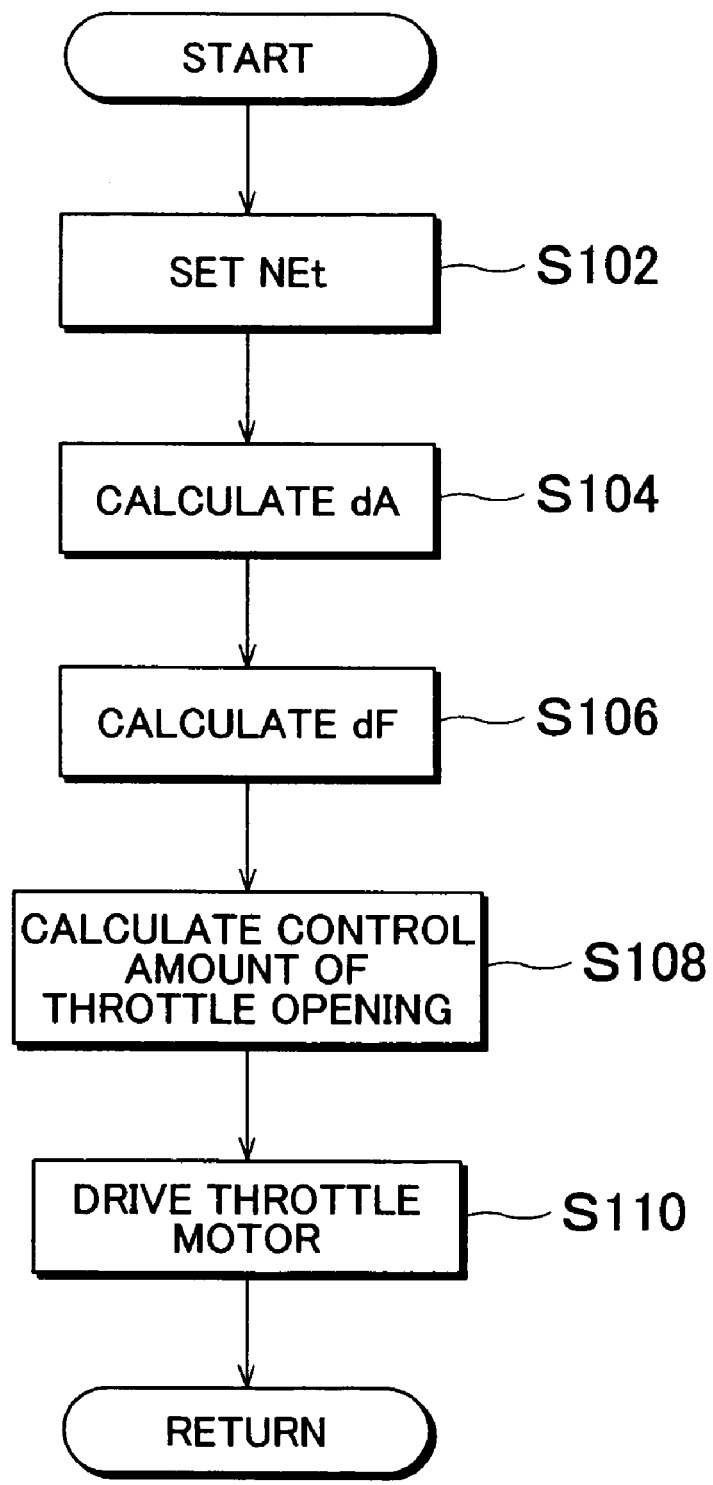
FIG. 4 is a flowchart representing a routine executed by an ECU to control the idling speed of the engine.
Figure 5:
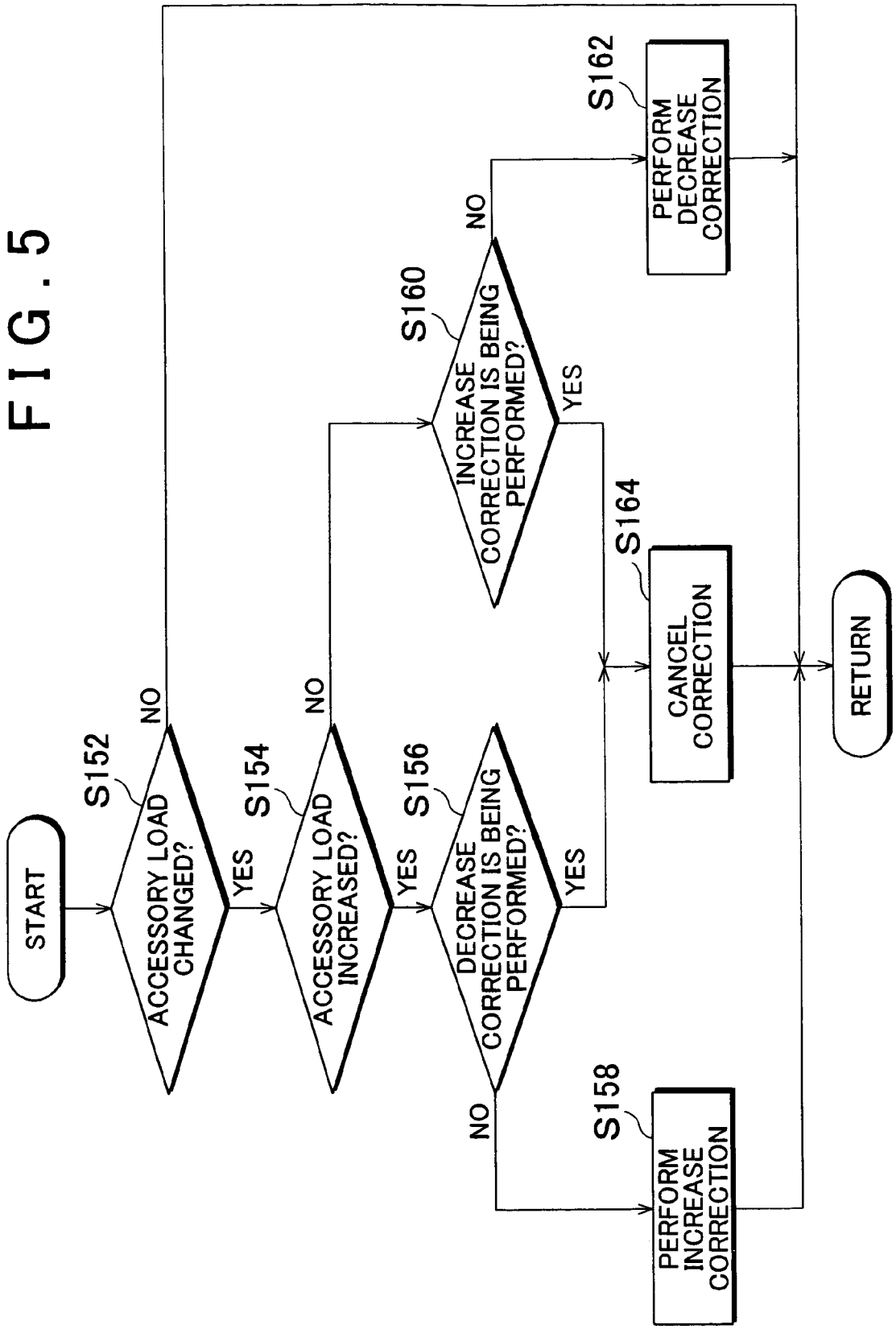
FIG. 5 is a flowchart representing a routine executed by the ECU to correct the operation angle and valve lift while the engine is idling.

The flowchart in FIG. 4 illustrates a routine that is executed by the ECU 4 to control the engine speed of the engine 2 during its idling (will be simply referred to as "idling speed"), and the flowchart in FIG. 5 illustrates a routine that is executed by the ECU 4 to correct the operation angle and valve lift of each intake valve 2a during engine idling. These routines are each repeated at a particular time interval.

Referring to FIG. 4, the ECU 4 first sets target engine speed NEt in step 102. At this time, the value of target engine speed NEt is set from among predetermined values and is made a different value depending on the air conditioner, as an accessory device, being ON or OFF (i.e., the air conditioner switch 53 being in the ON or OFF position). More specifically, target engine speed NEt is made larger when the air conditioner is ON than when OFF, so as to cope with the load generated by the air conditioner.

Next, the ECU 4 calculates preliminary throttle opening correction amount dA in step 104. The value of dA is set to 0 when the air conditioner (i.e., accessory device) is OFF, and to a value corresponding to the load of the air conditioner when the air conditioner is ON.

Subsequently, the ECU 4 calculates feedback correction amount dF based on difference Δ NE between target engine speed NEt and actual engine speed NE (NEt-NE) in step 106. In this calculation, for example, a known PID (Proportional-Integral-Differential) or PI (Proportional-Integral) calculation method may be performed with the calculated difference Δ NE. In either method, the integral term I is separately calculated for the ON state and the OFF state of the air-conditioner.

Then, in step 108, the ECU 4 calculates the amount the throttle valve 26 is to be operated from throttle opening correction amount dA and feedback correction amount dF calculated in the previous steps, and in step 110, the ECU 4 drives the throttle motor 24 according to the amount calculated in step 108, thereby bringing throttle opening TA to a target value, after which the present cycle of the routine ends. In this way, the ECU 4 controls the throttle valve 26 so as to set intake amount GA to such a value as to achieve the target engine speed during engine idling.

Next, the routine in FIG. 5 that is executed together with the idling speed control routine in FIG. 4 will be explained. Referring to FIG. 5, the ECU 4 first determines in step 152 whether a change has occurred to the state of load generated by the air conditioner as one exemplary accessory device, (will hereinafter be referred to as "accessory load state" where necessary). If the air conditioner has continuously been in either the ON or OFF state from the last cycle of this routine ("NO" in step 152), the ECU 4 ends the present cycle of the routine.

Meanwhile, if a change has occurred to the accessory load state ("YES" in step 152), the ECU 4 then proceeds to step 154 and determines whether the accessory load has increased from the last cycle of the routine.

If "YES" in step 154, the ECU 4 then proceeds to step 156 and determines whether a decreasing correction process in which the operation angle and valve lift of the intake valves 2a are decreased via the variable valve mechanism 54 is being executed. More detail of the decreasing correction process will be described later.

If "NO" in step 156, the ECU 4 then proceeds to step 158 and executes an increasing correction process in which the operation angle and valve lift of the intake valves 2a are increased. After this step, the present cycle of the routine ends.

The ECU 4 controls the operation of the variable valve mechanism 54 based on a particular control map(s) associated with the running state of the engine 2 which is determined from the value of engine speed NE and the engine load which is typically determined from intake amount GA and accelerator opening ACCP. Thus, the increasing correction process in step 158 increases the operation angle and the valve lift of the intake valves 2a set based on the foregoing control map.

Figure 6:
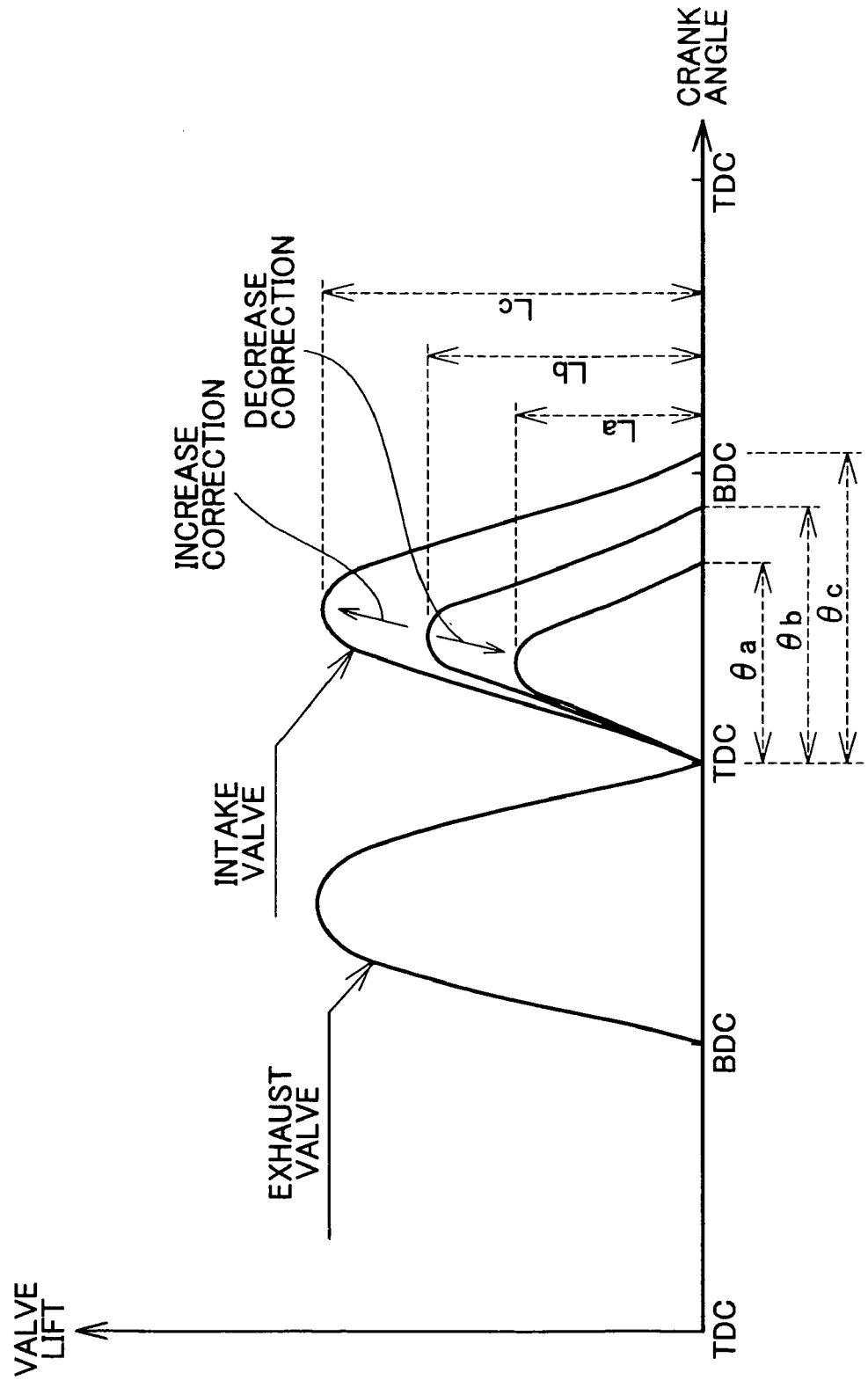
FIG. 6 is a graph illustrating s state in which the operation angle and valve lift of an intake valve are changed in response to the load generation state of the accessory device being generated or removed.

For example, referring to FIG. 6, when the operation angle and valve lift are normally set to θ b and Lb, respectively, as the standard operation angle and valve lift set based on the foregoing control map, the increasing correction process increase them up to θ c and Lc. Here, it is to be noted that in this exemplary embodiment the valve timing mechanism 58 is used, as well as the valve operation angle adjusting mechanism 56, to maintain the same valve open timing between before and after the operation angle and valve lift of the intake valves 2a are increased in the increasing correction process described above.

In the next cycle of the routine, if the air conditioner is still in the ON state ("NO" in step 152), the ECU 4 ends this cycle of the routine. That is, as long as the idling state of the engine 2 and the ON state of the air conditioner continue, substantially no further-processes will be executed in the routine of FIG. 5.

In the meantime, when the air conditioner is turned off during the idling state of the engine 2 (i.e., the accessory load state changes), the ECU 4 then determines "YES" in step 152, and as aforementioned, determines whether the accessory load has increased in step 154. At this time, however, since the accessory load has decreased as a result of the air conditioner being turned off ("NO" in step 154), the ECU 4 proceeds to step 160 and determines whether the increasing correction process for increasing the operation angle and valve lift of the intake valves 2a is being executed.

Since the increasing correction process is underway at this time ("YES" in step 160) as is evident from the foregoing descriptions, the ECU 4 proceeds to step 164 and cancels the increasing correction process by resetting the correction amounts applied to the standard values (i.e., standard operation angle and valve lift) determined from the foregoing control map to zero, whereby the operation angle and valve lift of the intake valves 2a return to θ b and Lb, respectively.

Figure 7:
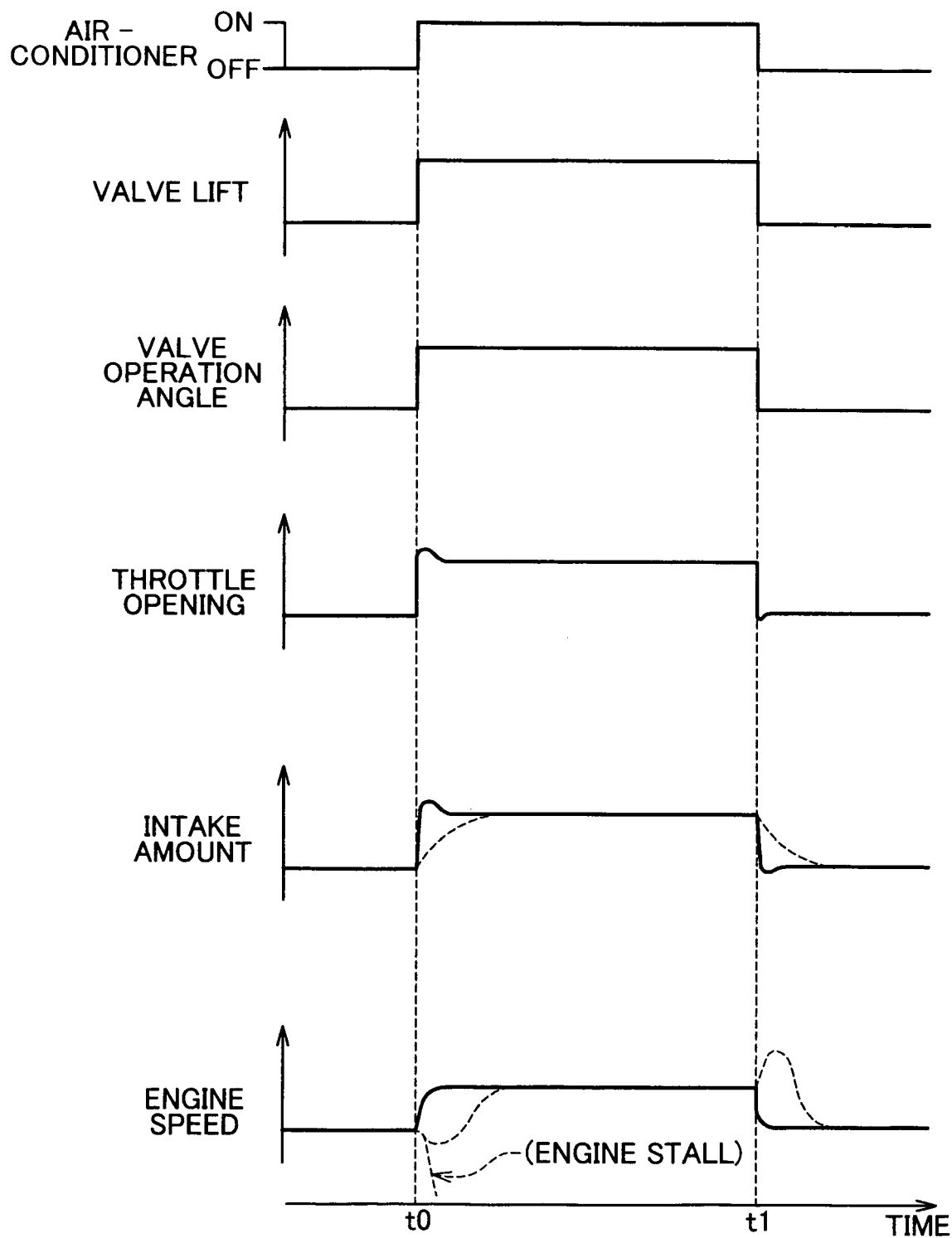
FIG. 7 is a timing chart illustrating a control state in the first exemplary embodiment.

Thereafter, each time the air conditioner is turned on and off, the ECU 4 will switch between the increasing correction process in step 158 and the correction cancellation in step 164. Such a control state is illustrated in the time chart in FIG. 7. Referring to FIG. 7, in response to the air conditioner being turned on at t0 (i.e., a shift from OFF state to ON state), the throttle opening is increased to a particular increased level according to preliminary throttle opening correction amount dA. At this time, the operation angle and valve lift of the intake valves 2a are also increased to particular increased levels, i.e., step 158 is executed. Thus, owing to the increased operation angle and valve lift of the intake valves 2a, the intake amount to the combustion chambers 12 quickly increases during the initial time period after the air conditioner was turned on. Such an increasing effect of the intake amount, however, will only last for a limited time. Namely, once the intake amount peaks, the increasing effect will soon diminish.

However, before the intake amount increasing effect due to the increased operation angle and valve lift of the intake valves 2a fades away, the intake air increased by the increased throttle opening reaches each combustion chamber 12, and therefore the intake amount will be maintained at the increased level.

Subsequently, when the air conditioner is turned off (ON state to OFF state) at t1, the throttle opening, the operation angle, and the valve lift are all decreased to the previous levels. At this time, the intake amount to the combustion chambers 12 immediately decreases due to the decreased operation angle and valve lift of the intake valves 2a. Such a decreasing effect of the intake amount, however, will only last for a limited time. Namely, once the intake amount reaches a certain decreased point, the decreasing effect will soon diminish.

However, before the intake amount decreasing effect by the decreased operation angle and valve lift of the intake valves 2a fades away, the intake air decreased by the decreased throttle opening will reach each combustion chamber 12, and therefore the intake amount will be maintained at the decreased (previous) level.

Meanwhile, when the operation angle and valve lift of the intake valves 2a are not changed (i.e., increased and decreased) together with the throttle opening TA, the resultant change in the intake amount will be sluggish as represented by a broken line in FIG. 7, and in bad cases, there will be the possibility of an engine stall due to the air conditioner being turned on at t0, or the engine 2 racing suddenly in response to the air conditioner being turned off at t1.

Meanwhile, the case in which and the air conditioner is turned off (i.e., a shift from ON state to OFF state) while the engine 2 is in the idling state and the air conditioner (i.e., accessory device) is in the ON state will be explained. In this case, the ECU 4 determines "NO" in step 154, and determines in step 160 whether the increasing correction process, which has been described in detail above, is now underway.

If the increasing correction process in not being executed ("NO" in step 160), the ECU 4 then proceeds to step 162 and executes the decreasing correction process, after which the present cycle of the routine ends.

The decreasing correction process decreases the standard operation angle and valve lift of the intake valves 2a set based on the foregoing control map. For example, referring to FIG. 6, when the operation angle and valve lift are normally set to θ b and Lb, respectively, as the standard values, the decreasing correction process decreases them down to θ a and La, respectively. Here, it is to be noted that in this exemplary embodiment the valve timing mechanism 58 is used, as well as the valve operation angle adjusting mechanism 56, to maintain the same valve open timing between before and after the operation angle and valve lift of the intake valves 2a are decreased in the decreasing correction process described above.

In the next cycle of the routine, if the air conditioner is still in the OFF state, the ECU 4 ends this cycle of the routine. That is, as long as the idling state of the engine 2 and the OFF state of the accessory device continue, substantially no further processes will be executed in the routine of FIG. 5.

In the meantime, when the air conditioner is turned on during the idling state of the engine 2, (i.e., the accessory load state changes), the ECU 4 then determines "YES" in step 152, and as aforementioned, determines in step 154 whether the accessory load has increased. At this time, however, since the accessory load has increased as a result of the air conditioner being turned on ("YES" in step 154), the ECU 4 proceeds to step 156 to determine whether the decreasing correction process for decreasing the operation angle and valve lift of the intake valves 2a is now underway.

Since the decreasing correction process is underway at this time ("YES" in step 156) as is evident from the foregoing descriptions, the ECU 4 then proceeds to step 164 and cancels the decreasing correction process by resetting the correction amounts applied to the standard values (i.e., standard operation angle and valve lift) determined from the foregoing control map to zero.

Figure 8:
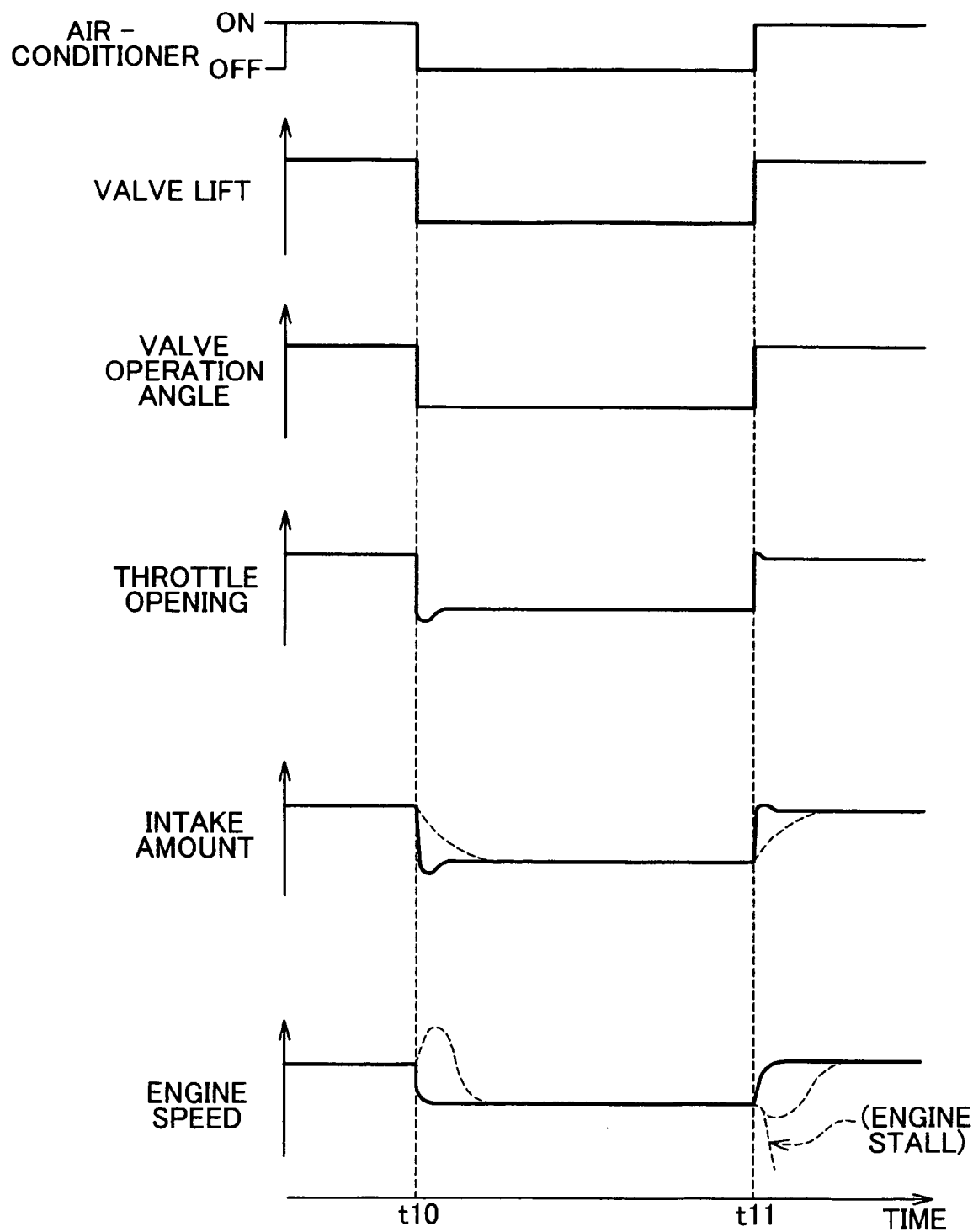
FIG. 8 is a timing chart illustrating another control state in the first exemplary embodiment.

Thereafter, each time the air conditioner is turned on and off, the ECU 4 will switch between the decreasing correction process in step 162 and the correction cancellation in step 164. Such a control state is illustrated in the time chart in FIG. 8. Regarding this time chart, the same explanation as given in conjunction with the shift from the ON state to the OFF state of the air conditioner at t1 (FIG. 7) during engine idling will be applied to the shift at t10, and similarly, the same explanation as given in conjunction with the shift from the OFF state to the ON state of the air conditioner at t0 (FIG. 7) during engine idling will be applied to the shift at t11.

According to the idling speed control system described above, the operation angle and the valve lift of the intake valves 2a, as well as the throttle opening (throttle opening TA), are adjusted during engine idling in response to a change in the accessory load state which has been detected from the signal of the air conditioner switch 53. That is, when the accessory load state shifts from a state in which no load is generated by the accessory device (air conditioner) to another state in which load is generated, each of the operation angle and the valve lift of the intake valves 2a, as well as the throttle opening, is increased by an amount corresponding to the load generated, so that the intake amount to each combustion chamber 12 immediately increases, thus preventing an unstable engine operation resulting from, for example, a drop in the engine speed which may otherwise be caused. On the other hand, when the accessory load is removed, each of the operation angle and the valve lift of the intake valves 2a, as well as the throttle opening, is decreased by an amount corresponding to the accessory load removed, so that the intake amount to each combustion chamber 12 immediately decreases, thus preventing an unstable engine operation resulting from, for example, a sharp increase in the engine speed which may otherwise be caused. In the latter case, also, the decreased operation angle and valve lift of the intake valves 2a decrease the pumping loss in the engine 2, which is desirable in view of the fuel economy.

Second Exemplary Embodiment of Invention

According to a second exemplary embodiment of the invention, after the throttle opening, the operation angle, and the valve lift of the intake valves 2a have been changed (increased or decreased) according to a change in the accessory load state, the operation angle and valve lift of the intake valves 2a are returned with time to the levels before changed. To implement this, the ECU 4 executes the routine shown in FIG. 9 instead of that shown in FIG. 5, in order to control the operation angle and valve lift of the intake valves 2a. Note that the idling speed control system in this embodiment has the same configuration as that described in the first exemplary embodiment and executes the routine shown in FIG. 4 as explained above, so refer to FIGS. 1 to 4.

Figure 9:
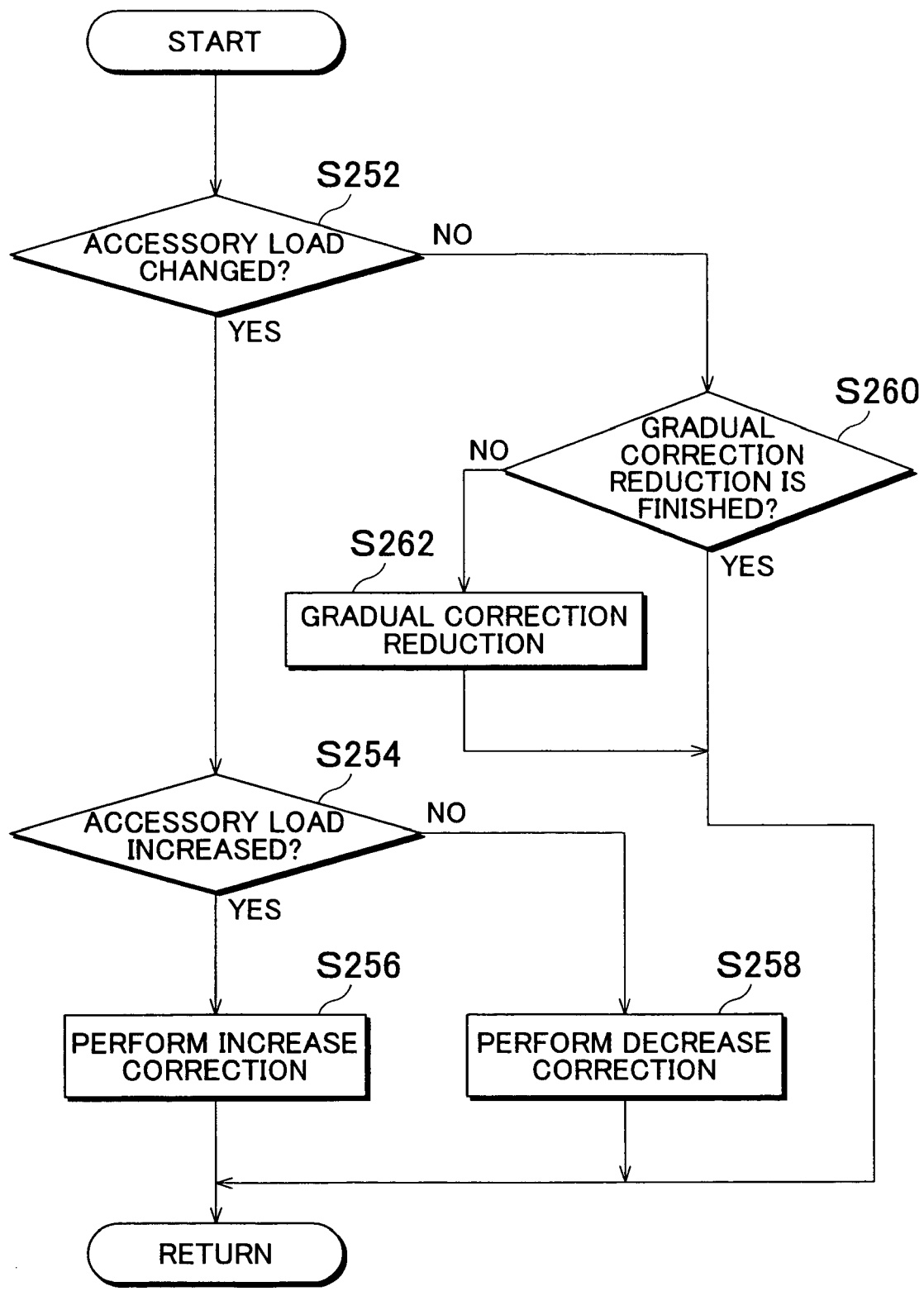
FIG. 9 is a flowchart illustrating a routine executed in the second exemplary embodiment to correct the operation angle and valve lift while the engine is idling.

Hereinafter, the routine in FIG. 9 that is repeatedly executed by the ECU 4 at specific time intervals will be explained in detail. Referring to FIG. 9, the ECU 4 first determines in step 252 whether a change has occurred to the accessory load state. If the air conditioner has continuously been in the ON or OFF state from the last cycle of this routine ("NO" in step 252), the ECU 4 proceeds to step 260 and determines whether a gradual correction reduction process, which will be described later, has been finished. The gradual correction reduction process is executed when the operation angle and valve lift of the intake valves 2a are set to corrected values by the foregoing increasing or decreasing correction process. Therefore, if none of the increasing and decreasing correction processes has been executed or the gradual correction reduction process has already been finished, the ECU 4 determines "YES" in step 260 and ends the present cycle of the routine.

Meanwhile, if a change has occurred to the accessory load state ("YES" in step 252), the ECU 4 then proceeds to step 254 and determines whether the accessory load has increased from the precious cycle of the routine. If "YES" in step 254, the ECU 4 then proceeds to step 256 and executes the increasing correction process in which the operation angle and valve lift of the intake valves 2a are increased using the variable valve mechanism 54. After this step, the present cycle of the routine ends.

As already explained in conjunction with step 158 in the first exemplary embodiment, the increasing correction process increases the operation angle and the valve lift of the intake valves 2a set based on the control map associated with the running state of the engine 2. In the timing chart of FIG. 10, the increasing correction process is activated at t20.

In the next cycle of the routine, if the air conditioner is still in the ON state ("NO" in step 252), the ECU 4 then proceeds to step 260 and determines whether the gradual correction reduction process has been finished. At this time, since the increasing correction process was executed in the last cycle and thus the operation angle and the valve lift of the intake valves 2a are presently set to particular increased values, the ECU 4 determines that the gradual correction reduction process has not yet been finished ("NO" in step 260), and proceeds to step 262 to activate the gradual correction reduction process.

Figure 10:
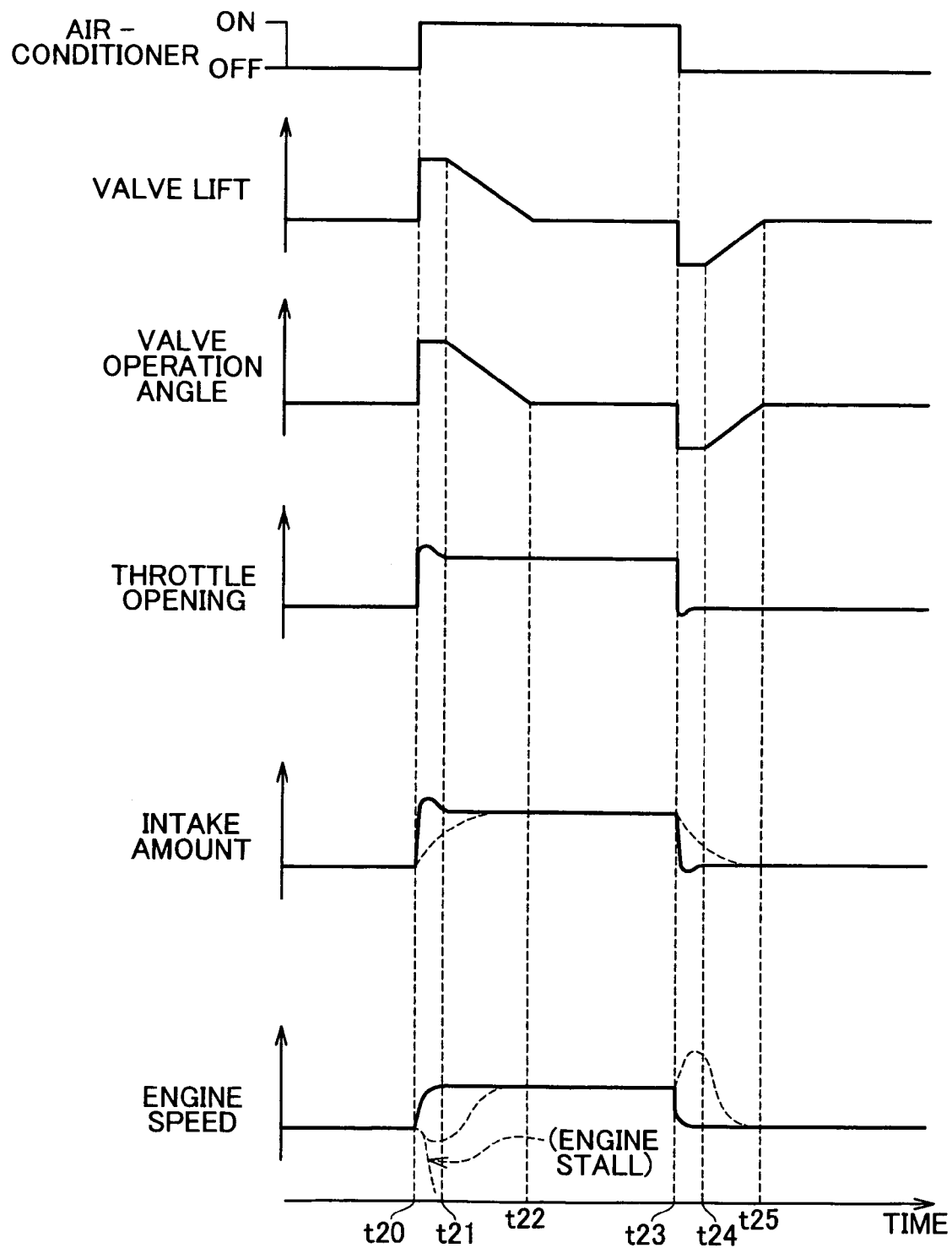
FIG. 10 is a timing chart illustrating a control state in the second exemplary embodiment.

That is, referring to the timing chart of FIG. 10, after the increased operation angle and valve lift have been maintained for a certain length of time (from t20 to t21), the ECU 4 activates the gradual correction reduction process that gradually reduces the correction amount for each of the operation angle and valve lift to zero with time or as a cumulative value of the engine speed increases. At this time, each correction amount for the operation angle and valve lift is decreased at such a rate as to enable each correction amount to be zeroed as fast as possible but not to cause a sudden and sharp change in the intake amount.

After step 262, the ECU 4 ends the present cycle of the routine, and in the succeeding cycles during the time period from t21 to t22, the ECU 4 repeats determining "NO" in step 260 and continues the gradual reduction diminution process.

When each correction amount has been zeroed (t22), the ECU 4 then determines "YES" in step 260 and ends the present cycle of the routine. When the air conditioner is turned off later (i.e., the accessory load state changes), the ECU 4 then determines "YES" in step 252, and judges in step 254 whether the accessory load has increased. In this case, since the accessory load has decreased as a result of the air conditioner being turned off ("NO" in step 254), the ECU 4 proceeds to step 258 and activate the decreasing correction process in which the operation angle and valve lift of the intake valves 2a are decreased using the variable valve mechanism 54, after which the ECU 4 ends the present cycle of the routine.

As already described in the first exemplary embodiment (step 162), the decreasing correction process decreases the operation angle and the valve lift of the intake valves 2a set based on the foregoing control map. Referring to the timing chart of FIG. 10, the decreasing correction process is activated at t20.

In the next cycle of the routine, if the air conditioner is still in the ON state ("NO" in step 252), the ECU 4 proceeds to step 260 and determines whether the gradual correction reduction process has already been finished. At this time, since the decreasing correction process was just executed in the last cycle and thus the operation angle and the valve lift of the intake valves 2a are presently set to particular decreased values, the ECU 4 determines that the gradual correction reduction process has not yet been finished ("NO" in step 260), and the ECU 4 proceeds to step 262 to activate the gradual correction reduction process.

That is, referring to the timing chart of FIG. 10, after the decreased operation angle and valve lift have been maintained for a certain length of time (from t23 to t24), the ECU 4 activates the gradual correction reduction process to gradually decrease the correction amount for each of the operation angle and valve lift to zero with time or as a cumulative value of the engine speed increases.

After step 262, the ECU 4 ends the present cycle of the routine, and in the succeeding cycles during the period from t21 to t22, the ECU 4 repeats determining "NO" in step 260 and continues the gradual correction reduction process.

When each correction amount has been zeroed (t25), the ECU 4 then determines "YES" in step 260 and ends the present cycle of the routine.

Through the foregoing routines, the intake amount is immediately adjusted in response to a change in the accessory load state in substantially the same manner as in the first exemplary embodiment.

According to the idling speed control system of the second exemplary embodiment, as well as the throttle opening (throttle opening TA), the operation angle and the valve lift of the intake valves 2a are adjusted during engine idling in response to a change in the accessory load state, thus preventing an unstable engine operation which may otherwise be caused. In particular, if the operation angle and valve lift of the intake valves 2a have been increased, they are returned to the level before increased, thus decreasing the pumping loss in the engine 2 which is desirable in terms of the fuel economy. Especially, when the operation angle and valve lift of the intake valves 2a are changed in response to the accessory load being generated or removed (i.e., in response to the air conditioner being turned on or off), the changed operation angle and valve lift will later be returned to the levels before changed gradually within a particular period of time, thus preventing an unstable engine operation which may otherwise be caused during the same period.

Figure 11:
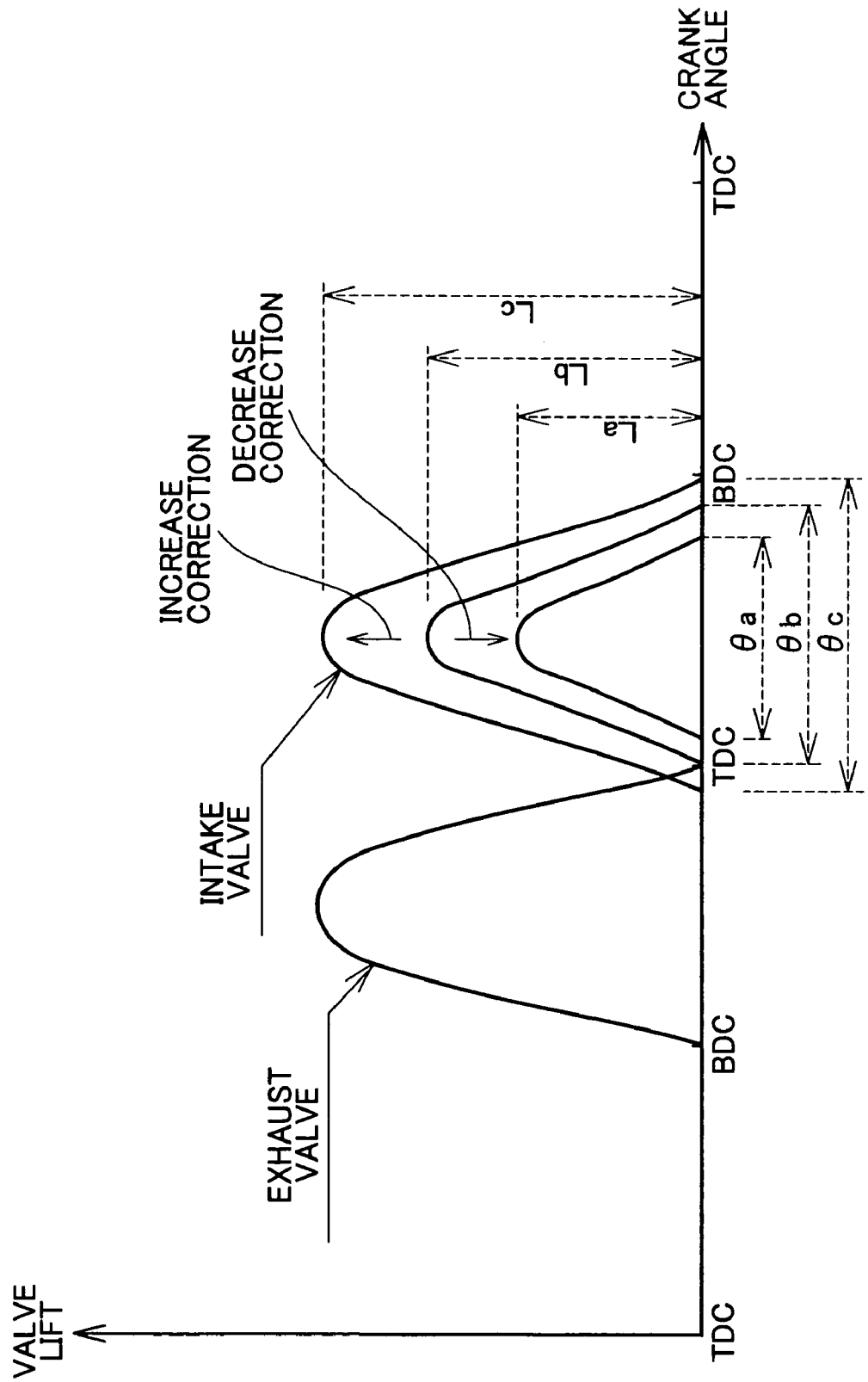
FIG. 11 is a graph illustrating another state in which the operation angle and valve lift of an intake valve are changed in response to the load generation state of the accessory device being generated or removed.

Modification Examples (a) While the valve timing mechanism is also used to maintain the valve timing of each intake valve 2a when its operation angle and valve lift are changed in response to a change in the accessory load state in the first and second exemplary embodiments, the operation angle and valve lift may be changed without regard to the valve timing, as illustrated in FIG. 11.

Figure 12:
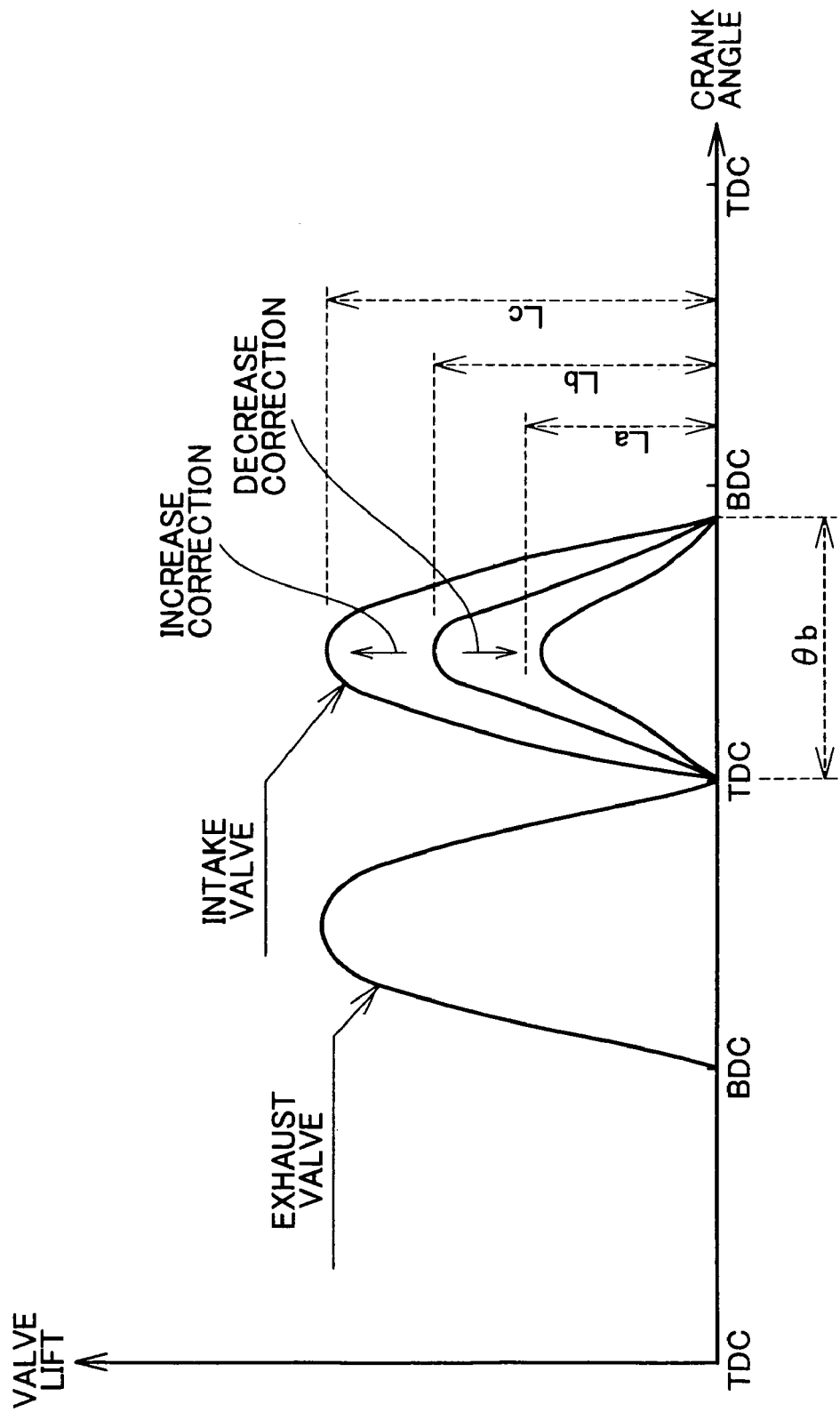
FIG. 12 is a graph illustrating another state in which the operation angle and valve lift of an intake valve are changed in response to the load generation state of the accessory device being generated or removed.
Figure 13:
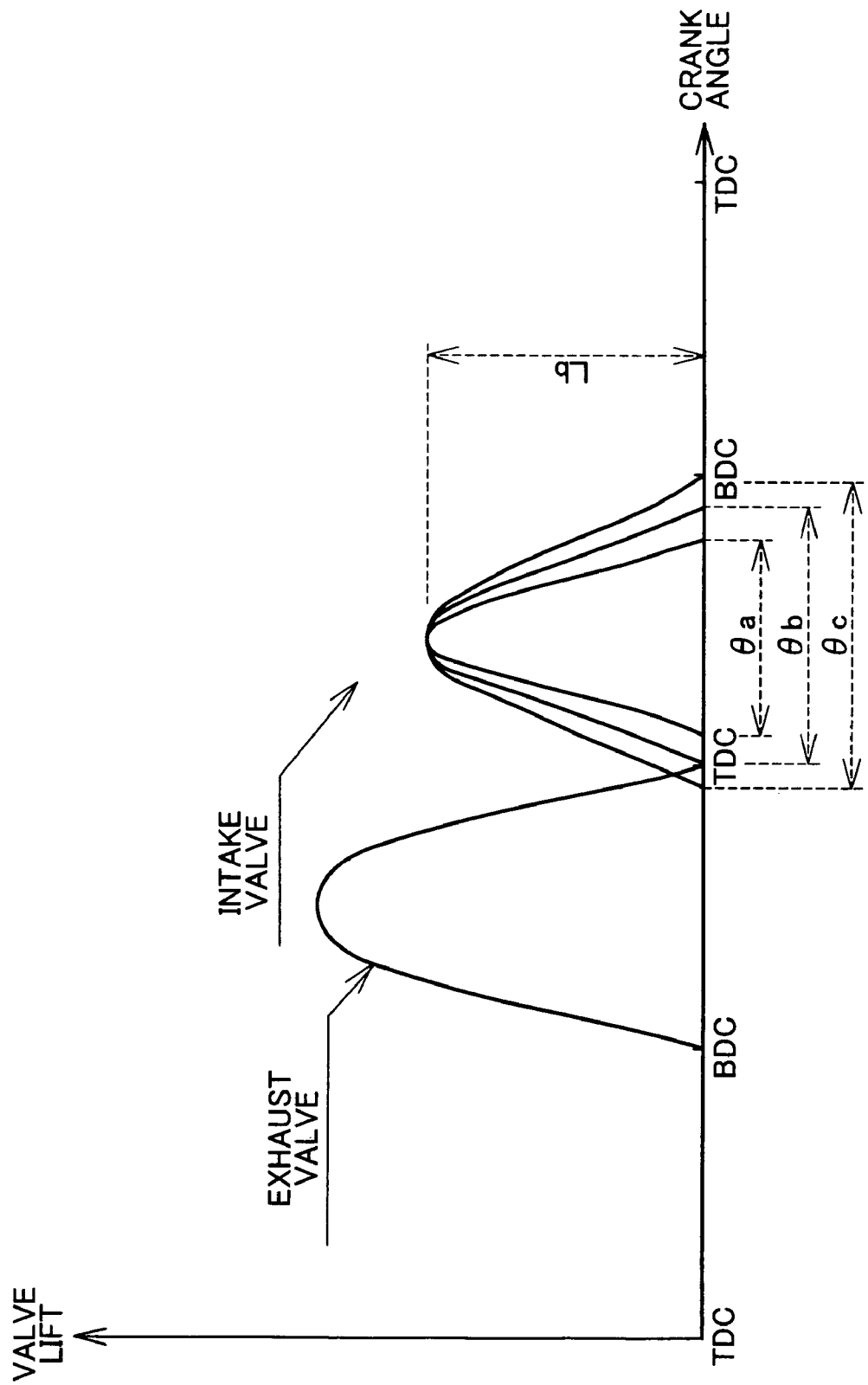
FIG. 13 is a graph illustrating another state in which the operation angle and valve lift of an intake valve are changed in response to the load generation state of the accessory device being generated or removed.

(b) While the operation angle and the valve lift are both adjusted in response to a change in the accessory load state in the first and second exemplary embodiments, only the valve lift may be changed without changing the operation angle as illustrated in FIG. 12, or only the operation angle may be changed without changing the valve lift as illustrated in FIG. 13. To realize the operations in FIGS. 12 and 13, a valve drive mechanism having an intake cam shaft that is slidable along its axial direction and has three-dimensional cams each having a profile that varies along the same axial direction may be used instead of the intermediate valve drive train 60. Also, as an alternative to using the intermediate valve drive train 60, electromagnetically driven valves may be used as the intake valves 2a and their operation angle and valve lift may be changed as illustrated in any of FIGS. 11 to 13.

(c) While the variable valve mechanism includes the valve timing mechanism according to the first and second exemplary embodiments, the valve control illustrated in FIG. 11 can be realized without the valve timing mechanism, so it may by omitted if unnecessary. Also, if the foregoing valve drive mechanism having an intake cam shaft that is slidable along its axial direction and has three-dimensional cams is used, the valve control illustrated in FIGS. 11 to 13 can be realized by simply moving the intake cam shaft along its axial direction.

(d) While the throttle valve 26 is used as the intake amount regulator valve in the first and second exemplary embodiments, an ISCV (Idling speed Control Valve) may be additionally provided in parallel with the throttle valve 26 and used as the intake amount regulator valve.

(e) While an air conditioner has been indicated as the accessory device in the first and second exemplary embodiments, it may instead be other accessory device acting as electric load (e.g., head lamp unit), hydraulic load (e.g., power-steering unit), or the like. Also, the control routines in the first and second exemplary embodiments may be performed with respect to a plurality of accessory devices such that the preliminary throttle correction amount is set and the operation angle and valve lift of each intake valve 2a are increased or decreased according to the load from each accessory device.

(f) According to the first and second exemplary embodiments, the idling speed of the engine 2 is controlled by controlling throttle opening TA as long as the accessory load state is not changed. Alternatively, in the same condition, the idling speed may be controlled by adjusting the valve lift or operation angle of each intake valve 2a while throttle opening TA is fixed at a certain small value. In this case, when the accessory load state changes, the operation angle and valve lift are both adjusted as described above.

(g) While the operation angle and valve lift corrected (increased or decreased) as a result of the accessory load generated and removed are gradually returned to the previous levels by decreasing the correction amount (i.e., the amount each of the operation angle and valve lift is increased or decreased) in the first and second exemplary embodiments, a process to return the correction amounts to the previous levels may be omitted when the correction has been made in response to the accessory load being removed, so that the pumping loss will further decrease.

While the invention has been described with reference to preferred embodiments thereof, it is to be understood that the invention is not limited to the preferred embodiments or constructions. To the contrary, the invention is intended to cover various modifications and equivalent arrangements other than described above. In addition, while the various elements of the preferred embodiments are shown in various combinations and configurations, which are exemplary, other combinations and configurations, including more, less or only a single element, are also within the spirit and scope of the invention.

What is claimed is:

1. An idling speed control system for an internal combustion engine, comprising:
    an intake amount regulator valve that is arranged in or along an intake passage of the internal combustion engine to regulate an intake amount supplied to the internal combustion engine;
    a variable valve mechanism that changes at least one of an operation angle and a valve lift of an intake valve of the internal combustion engine;
    wherein the variable valve mechanism includes a valve control mechanism that changes the at least one of the operation angle and the valve lift of the intake valve seamlessly, and
    after the at least one of the operation angle and the valve lift of the intake valve has been changed via the variable valve mechanism in response to the change in the load generation state of the accessory device, the controller controls the variable valve mechanism to gradually change the at least one of the operation angle and the valve lift back to a level before being changed;
    a controller that controls the intake amount regulator valve and the variable valve mechanism; and
    an accessory device that is mechanically or electrically connected to the internal combustion engine and generates a load on the internal combustion engine during operation; wherein
    when a load generation state of the accessory device changes while the internal combustion engine is idling, the controller controls the intake amount regulator valve to change its opening and controls the variable valve mechanism to change the at least one of the operation angle and the valve lift of the intake valve in accordance with the change in the load generation state of the accessory device.

2. An idling speed control system according to claim 1, wherein if the change in the load generation state of the accessory device is a shift from a state in which the accessory device generates no load on the internal combustion engine to a state in which the accessory device generates a load on the internal combustion engine, the controller controls the intake amount regulator valve to increase its opening by an amount corresponding to the load generated by the accessory device, and controls the variable valve mechanism to increase the at least one of the operation angle and the valve lift of the intake valve by an amount corresponding to the load generated by the accessory device.

3. An idling speed control system according to claim 1, wherein if the change in the load generation state of the accessory device is a shift from a state in which the accessory device generates a load on the internal combustion engine to a state in which the accessory device generates no load on the internal combustion engine, the controller controls the intake amount regulator valve to decrease its opening by an amount corresponding to the load removed as a result of the shift of the load generation state of the accessory device, and controls the variable valve mechanism to decrease the at least one of the operation angle and the valve lift of the intake valve by an amount corresponding to the load removed as a result of the shift of the load generation state of the accessory device.

4. An idling speed control system according to claim 1, wherein
    the variable valve mechanism includes a mechanism that changes both the operation angle and the valve lift of the intake valve.

5. An idling speed control system according to claim 1, wherein
    the variable valve mechanism includes a valve timing mechanism that changes a valve open timing at which the intake valve is opened, and
    the controller controls the variable valve mechanism so that the same va lve open timing is maintained via the valve timing mechanism after the at least one of the operation angle and the valve lift of the intake valve has been changed in response to the change in the load generation state of the accessory device.

6. An idling speed control system according to claim 1, wherein the variable valve mechanism is provided in series with the intake amount regulator valve.

7. A method for controlling an idling speed of an internal combustion engine, comprising;
    detecting a change in a load generation state of an accessory device while the internal combustion engine is idling;
    seamlessly changing at least one of an operation angle and a valve lift of an intake valve of the internal combustion engine, as well as changing an amount of an intake air drawn into the internal combustion engine, in accordance with the detected change in the load generation state of the accessory device; and
    gradually changing the at least one of the operation angle and the valve lift back to a level before being changed.

8. The method according to claim 7, wherein a variable valve mechanism is used to change the at least one of the operation angle and the valve lift of the intake valve of the internal combustion engine, and an intake amount regulator valve is used to change the amount of the intake air drawn into the internal combustion engine.

* * * * *